Figure 1:
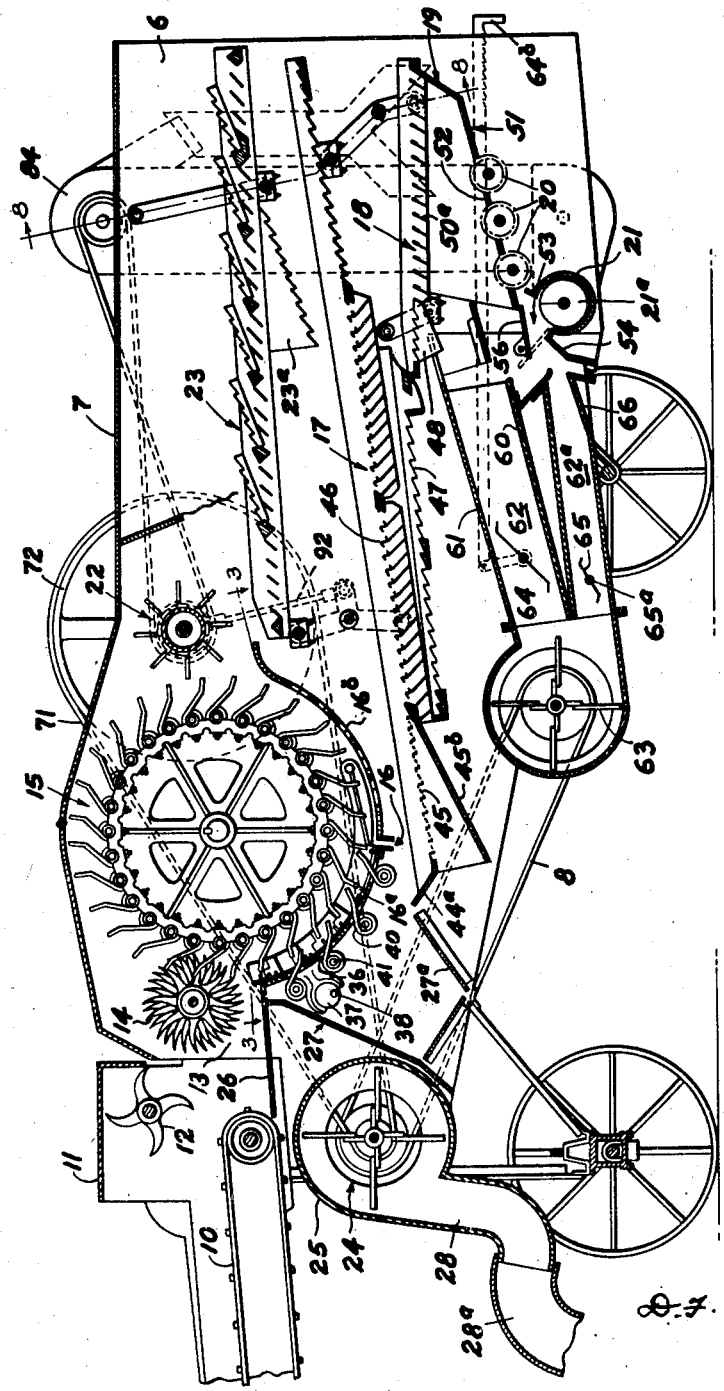

Nov. 16, 1948.  D. F. GOOD  2,454,156
PEANUT PICKER
Filed Nov. 21, 1942  3 Sheets-Sheet 1

Inventor
D. F. Good
By
Ayats Dowell
Attorney

Nov. 16, 1948.                 D. F. GOOD                 2,454,156
                              PEANUT PICKER
Filed Nov. 21, 1942                                    3 Sheets-Sheet 3

Inventor
D. F. Good,

Patented Nov. 16, 1948

2,454,156

UNITED STATES PATENT OFFICE 2,454,156

PEANUT PICKER

Daniel F. Good, Waynesboro, Pa., assignor to Frick Company, Franklin County, Pa.

Application November 21, 1942, Serial No. 466,470

13 Claims. (Cl. 130—30)

This invention relates to agricultural implements and more particularly to those used primarily in harvesting.

The invention specifically relates to a peanut picker and includes improvements over the machines disclosed in my copending applications Ser. No. 350,511, patented May 23, 1944, No. 2,349,262, and Ser. No. 350,512, filed August 3, 1940, now abandoned, and is a continuation-in-part of the latter application.

Heretofore peanut pickers have had certain undesirable features and weaknesses which have made them objectionable and unsatisfactory. These machines have not been durable; they have been too expensive and required too much personal care. Therefore, they were not only to a degree impractical, but in fact a nuisance. In addition to the above undesirable characteristics the machines have not satisfactorily performed the functions for which they were designed.

It is an object of the invention to provide a peanut picker of relatively simple, inexpensive and durable construction which will satisfactorily and efficiently perform the work for which it was designed.

It is a further object of the invention to provide a peanut picker that will discharge peanuts, free of stems and otherwise clean, in a comparatively short time and embodying resilient connections for reciprocating grid pans and other parts which provide a more efficient threshing operation and at the same time do not require lubrication and are unaffected by dust and dirt which would ordinarily provide a grinding compound to destroy the connection.

Briefly described, the machine comprises conveyor mechanism for feeding peanut vines with the peanuts thereon into the machine, a dust collector for removing dust and loose matter by vacuum or suction from the vines and peanuts as they are fed in, a feeding cylinder for introducing the vines into contact with a picking cylinder working in conjunction with a two-part adjustable concave bed, a stripping cylinder and reciprocable racks and grid pans, stemmer saws and additional stone removing means and air blast means for further cleaning the nuts.

The machine also provides improved supporting means for the reciprocable pans in the form of resilient connections which facilitate limited oscillatory motion and increase efficiency; require no lubricant and are unaffected by dust or dirt that would ordinarily collect and provide a grinding compound.

Figure 2:
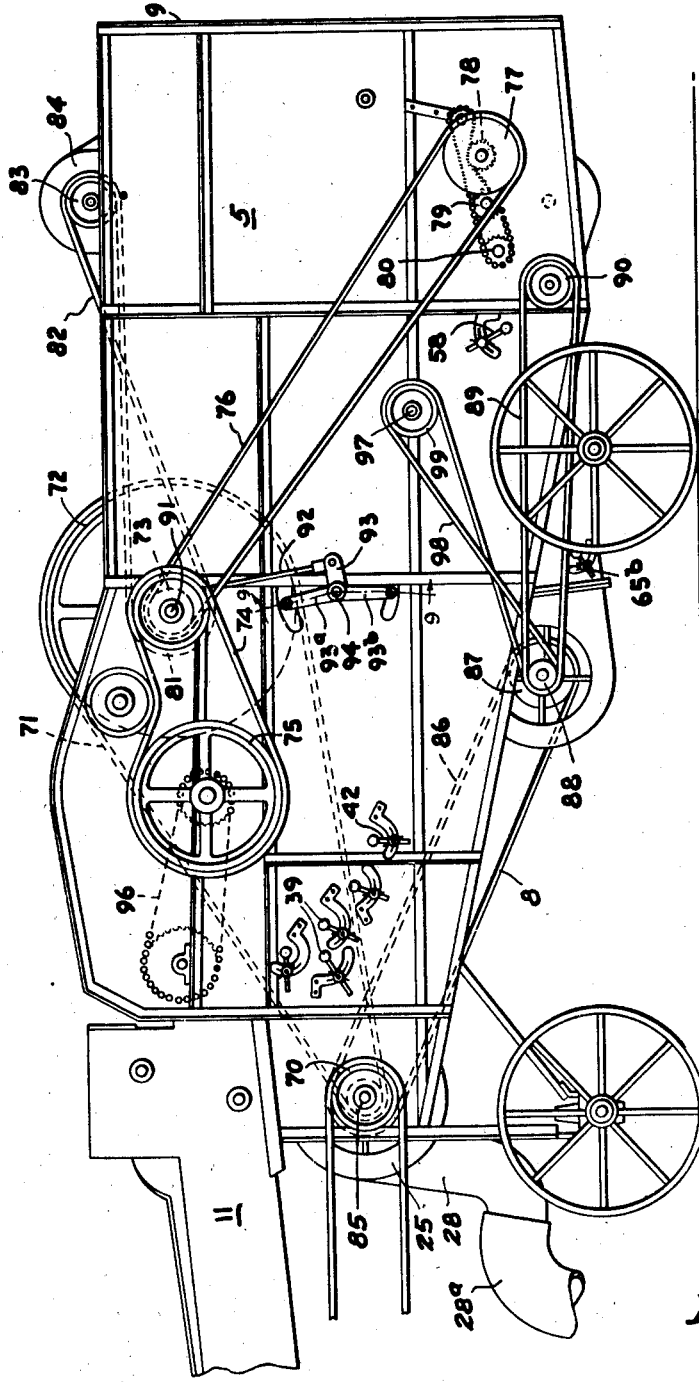
Figure 3:
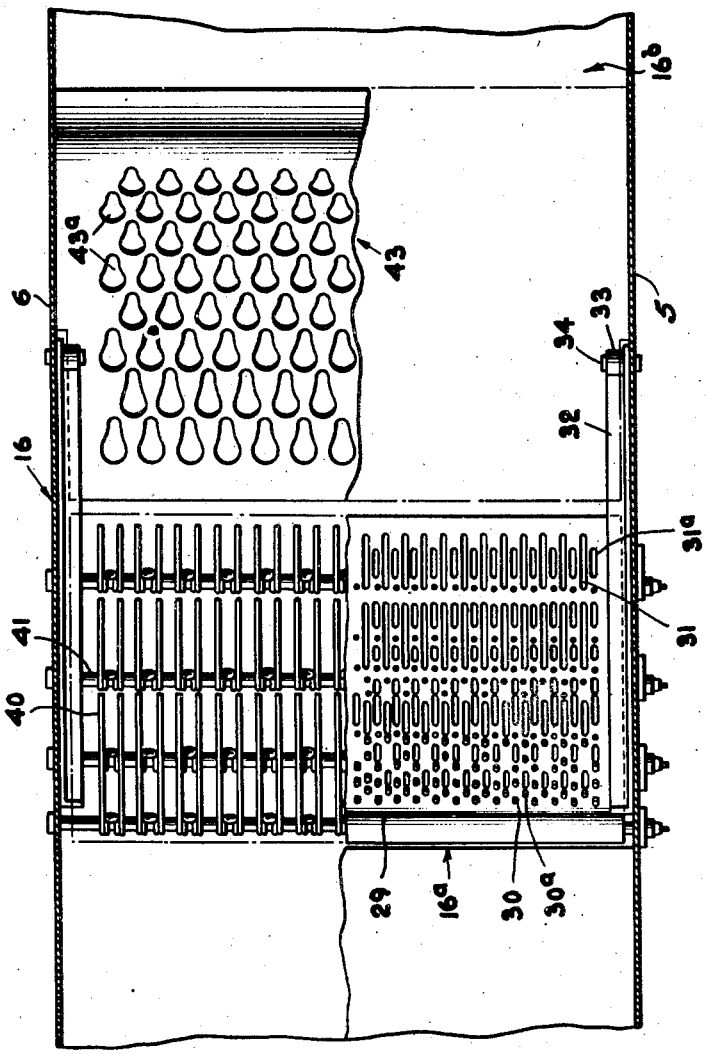

The machine further incorporates improved features including:

A more efficient, two part concave or stripping screen located beneath the picking cylinder, and coacting with the latter to strip the peanuts from the vines;

Simplification in construction of the stemming apparatus while at the same time increasing the capacity of the latter to take care of any load the machine is capable of handling;

Provision of means for freeing the peanuts of stones or like extraneous matter which may have been carried through the machine with the peanuts to the delivery end of the machine;

An improved and more efficient grid pan and cleaning pan assembly;

Simplification in construction while maintaining high efficiency;

And other features of novelty and advantage which will become apparent in view of the following description taken in conjunction with the drawings, wherein:

Fig. 1 is a longitudinal section of a peanut picking machine in accordance with the present invention;

Fig. 2, a view in side elevation of the machine of Fig. 1; and,

Fig. 3, a sectional plan view taken substantially on the line 3—3, of Fig. 1 showing the construction of the concave or stripping screen unit and partly broken away to also show the retarding pins beneath said unit.

Referring to the drawings, particularly Figs. 1 and 2, the parts of the machine are enclosed by a housing including side walls or panels 5 and 6, top panels 7, open bottom panels 8, and open end panels 9. A conveyor 10 is adapted to be loaded with vines so that they may be carried by the conveyor into housing 11 of the machine and engaged by a rotary first feeding cylinder or star wheel 12 and fed to a head chamber 13, where the vines are taken by a second feeding cylinder 14 (rotating counterclockwise as viewed in Fig. 1) and carried around to picking cylinder 15, which likewise rotates in a counter-clockwise direction and at a predetermined speed with respect to the second feeding cylinder. The first feeding cylinder or star wheel 12 is rotated at a speed which will feed the vines at the proper rate to be handled by the second feeding cylinder 14. The star wheel 12 thus acts as a means to limit the amount of vines fed into the machine in accordance with the speed of rotation thereof.

Below the picking cylinder is a concave bed 16 consisting of sections 16a and 16b, the former constituting the concave bed proper which is adjustable and the section 16b constituting a stripping screen. Extraneous matter, including trash, dust, dirt or the like, are removed through the adjustable section 16a and the nuts pass onto and through the openings in section 16b onto a grid pan 17 which advances the nuts to the right as viewed in Fig. 1 and thence into wind blast cleaning grid 18 through which the nuts fall onto pan 19, during which they are subjected to the action of the cleaning fan and to the stemmer saws 20 and then pass, either directly into the peanut delivery auger or discharge conveyor trough 21 for movement by auger 21a therein or indirectly through the stone cleaning unit and then to the discharge conveyor trough 21.

The vines are taken by stripping cylinder 22 and thrown onto vine rack 23, which progresses the vines to the rear of the machine and discharges them therefrom for baling, any nuts carried with the vines falling through the vine rack onto grid section (to be described) of pan 17. At the rear of the vine rack a return section 23a is installed to carry any nuts that may drop through at this point to the grid of pan 17.

As the vines are fed into the head chamber 13, they are subjected to the suction action of a dust collector or suction fan 24 mounted in housing 25 which is in suction communication through perforated feed board or partition 26 with the chamber 13 and also with the concave area through perforated partition 27. The area beneath the concave 16a may be closed off by partitions 27a to more effectively concentrate the suction action. The suction fan thus draws dust and dirt from the vines as they are fed into the machine and also during the stripping operation, the dust, dirt and other extraneous matter being discharged through conduit 28 and flexible extension 28a thereof, which may extend along the ground such distance as will ensure clearance of the dust down wind.

A feature of the present machine resides in the construction and mounting of the concaves and concave bed, generally indicated at 16, and which is shown in detail in Fig. 3. The concave bed proper 16a, or the section to which the vines are first subjected, comprises an arcuate-shaped body pan 29 having a series of teeth or pins 30 and 30a of different lengths projecting upwardly therefrom and which may be termed the concave bed teeth. The pan 29 may be made of relatively heavy sheet metal or like material and is formed with a series of slots 31, 31a. The opposite side edges of the pan 29 are secured to arcuate-shaped arms or holders 32, the one end of each bracket being provided with a bearing 33 by means of which it is pivotally mounted on a bearing pin 34, fixed to the side walls of the machine. The pan 29 at its front edge is turned outwardly at an angle to provide a reinforcing nose which bridges the gap between the feed board 26 and the pan, and the rear edge is turned downwardly to reinforce the metal at this point.

Means are provided whereby the forward or concave bed proper 16a may be adjusted toward or from the picking cylinder 15. Accordingly, this section is provided with bearing yokes 36, note Fig. 1, which engage over cams or eccentrics 37 connected to cross shaft or rod 38, said shaft being provided with a crank or handle 39 (Fig. 2) on the exterior of the machine whereby it may be conveniently rotated to swing the concave bed about its pivots 34.

This adjustment is designed primarily to take care of plants or vines and nuts of varying sizes. Thus, should the peanuts be small, the concave bed 16a may be adjusted towards the picking cylinder 15, whereas if large, the adjustment may be away from said cylinder. In other words, the concave bed may be adjusted to always maintain the proper relation of the picking cylinder and concave teeth to prevent the breaking of nuts passing between the same, resulting in increased picking efficiency.

Coacting with the teeth 15a of the picking cylinder 15 are a series of retarding concave pins or teeth 40 (Fig. 1), the said teeth being secured on cross shafts 41 which are rotatably mounted at opposite ends in bearings carried by the side walls of the machine and are each provided with an adjusting handle 42 (Fig. 2) accessible from the exterior of the machine. The concave pins or teeth 40 project through the slots 31 of the concave bed section 16a and function in a manner similar to the retarding pins of the machine of my prior application Ser. No. 350,511. However, in this instance they are adjustably mounted, so that they may be raised when the vines are tough and lowered when the vines are dry, thus removing the nuts from the tough vines or preventing the breakage of vines when dry. Furthermore, they are curved and preferably given a resilient or spring mounting similar to the teeth 15a of the picker cylinder.

The slots 31 and 31a, while being of sufficient size to enable the withdrawal of dust, sand and like particles from the vines by the suction fan 24 are not of such size as to permit the nuts to pass therethrough, the latter passing around to stripping screen 16b and falling through pear-shaped openings 43a formed therein and onto the front solid section of grid pan 17.

The grid pan in its preferred form comprises a supporting frame including side rails 44, front inclined board 44a and cross pieces 44b. The bed of the pan comprises a front corrugated nut-progressing section 45, an intermediate grid section 46 and a rear solid or non-perforated progressing section 45a. These sections are individually removable and replaceable in the supporting frame.

The section 45 has a perforated screening surface for sifting out sand, dirt and the like and below this section is a catch pan 45b inclined forwardly and having its front end open to effect discharge of extraenous material caught by the pan.

The grid section 46 is provided with a series of screening openings which are of a size to readily permit peanuts to pass therethrough while at the same time catching lengths of vine pieces, sticks and the like which may pass with the nuts through the section 16b of the concave or stripping screen and progress the same rearwardly onto the solid section. The grid or screening section 46 is corrugated in a manner similar to the section 45, so as to progress the vine lengths, sticks and like chaff rearwardly.

Below grid section 46 is a supplemental solid or non-perforated progressing pan 47 which is hung from the main pan and lies in a substantially horizontal plane with respect to the main upper section of the grid pan 17.

It will be noted that the main or upper section of the grid pan as a whole is inclined upwardly toward the rear of the machine. This tends to retard the movement of the peanuts or prevents a too rapid movement thereof over the grid consistent with efficient cleaning.

From section 47 the nuts are progressed rearwardly onto downwardly inclined blast-deflector section 48 which facilitates discharge of the nuts onto grid 18, note Figs. 5 and 5a. The cleaner grid 18 is preferably made up of spaced cross strips 50a and longitudinal strips 50b providing a series of rectangular openings, the cross pieces or strips 50a being inclined at an angle rearwardly to more effectively distribute the wind blast and direct it outwardly and upwardly so that its full force is applied to the discharge of the vines. These strips are suitably anchored at their ends to side frame members 50c and end frame members 50d.

The peanuts drop through cleaning grid 18 onto bottom floor or pan 51 forming part of pan 19, which floor is inclined to the left as viewed in Fig. 1, or forwardly and downwardly, and is formed with a series of elongated slots 52 through which the stemmer saws 20 project.

Thus as the nuts drop through grid 18 they are subjected to the action of the stemmer saws 20, the stems dropping through the slots 52 and the peanuts passing to the entrance opening of hopper of delivery trough or conduit 21, note particularly Fig. 6.

The peanuts may either pass directly into the hopper opening 53 from the pan 51 or may be passed indirectly into said hopper over inclined baffle board 54 having side boards 54a and a chute section 55. This action is controlled by a valve member or board 56 which is fixed on a shaft 57 and rotatable by means of a handle 58 from the exterior of the machine. In rear of valve board 56 is a baffle or deflector board 59 which is connected to the one end of a partition 60 and is provided with a curved extension 59a at its lower end.

The partition 60 divides the housing 61 of the wind blast or fan mill unit into upper and lower passages 62 and 62a, the blast being provided by fan 63. The blast through passage 62 is controlled by means of valve 64 mounted on a shaft and manually adjustable by handle 64b from the exterior of the machine; while the blast through passage 62a is controlled by valve 65 mounted on shaft 65a adjustable from the exterior of the machine by handle 65b. The forward end of the passage 62a is provided with an upwardly inclined baffle board 66 having connected to the front end thereof a chute board 67 which coacts with the board 55 to provide a discharge chute for stones and like relatively heavy particles.

The trough 21 in which the delivery auger 21a operates is formed with a series of screening openings along the bottom portion thereof which are preferably oblong in shape, to effect removal of any dust and dirt that may remain at the final passage of the peanuts.

The drive from a suitable source may be applied to pulley wheel 70 from which it is taken by belt 71 to pulley 72 which drives the stripping cylinder 22. From the stripping cylinder the drive is taken by pulley 73 and belt 74 to pulley 75 which drives the picking cylinder. Also, from pulley 73 the drive is taken by belt 76 to pulley 77, the shaft for which carries a sprocket 78 having trained thereover link belt 79 which drives a series of sprockets 80 for the stemmer saws 20. Another pulley 81 transmits the drive from shaft 91 through belt 82 to pulley 83 which drives the sacker elevator 84, not shown in detail and forming no part of the present invention. The fan mill drive is taken from pulley 85 through belt 86 to pulley 87 secured on the fan shaft. Another pulley 88 mounted on said latter shaft transmits the drive through belt 89 to pulley 90, which drives the conveyor auger 21a.

The vine rack 23 and grid pan 17 are shaken or oscillated by means of crank connections on the opposite ends of the pulley shaft 91 which operate rods 92 with arms 93 of bell cranks (one set on each side of the machine), the latter in turn being secured on the opposite ends of shaft 94 (Fig. 9) and having arms 93a and 93b, arms 93a being pivotally connected to vine rack 23, and arms 93b being pivotally connected to grid pan 17. The cleaning grid 18 is pivotally connected with the rear end of the grid pan 17 by rocker arms 95 secured on the opposite ends of shaft 95a (Fig. 8) to thereby transmit a similar shaking or oscillatory movement to both grids. The particular manner in which these grids are mounted will be more fully hereinafter described in connection with Figs. 8, 9 and 10.

The second feeding cylinder 14 is positively driven in synchronism with the picking cylinder 15 by means of chain 96.

Counter shaft 97 driven by belt 98 and pulley 99 may be used to drive a drag stacker, not shown and forming no part of the present invention.

The operation in general is as follows: Vines with the nuts thereon are disposed on the conveyor 10 and are taken therefrom by feeding cylinders 12 and 14, the latter carrying the vines around into operative relation with the teeth 15a of the picking cylinder 15. The feeding cylinder 14, being rotated at a slower speed than the picking cylinder, exerts a holding or retarding action on the vines as the teeth of the picking cylinder rake the nuts therefrom. The picking cylinder carries the vines around to the concave bed 16a at which point the vines and nuts are subjected to the action of the retarding pins or teeth 40 as well as the pins or concave teeth 30 and 30a, there being a further stripping action of the peanuts from the vines at this point. The suction blast is applied through the feed board 26 and partitions 27 and through the slots 31 and 31a of the concave bed 16a to withdraw dust and dirt and like extraneous matter and transmit the same a distance from the machine, preferably down wind. The vines are subjected to a further stripping action by the stripping screen section 16b, the nuts dropping through the pear-shaped openings 43 of the said screen onto portion 45 of the grid pan 17. The nuts are progressed rearwardly onto the grid 46 of said pan, at which point vine lengths, sticks and like matter, which may have passed through the screen section 16b with the nuts, are separated from the latter and progressed rearwardly and finally removed at the rear end of the machine by the wind blast, the nuts dropping through the grid section 46 onto blast deflector section 47, where they are progressed onto section 48 and thence onto cleaning grid 18 where they are acted on by the wind blast. From cleaning grid 18 the nuts drop onto pan 51, where they are subjected to the action of the stemmer saws 20.

Actual experience has demonstrated the high cleaning efficiency of the machine, while at the same time the number of parts is less than usually found in machines of this type and manufacturing costs are relatively low.

It will be understood that certain changes in the construction and design of the machine as a whole as well as the respective parts may be adopted without departing from the spirit or

I claim:

1. In a peanut picking machine, a picking cylinder, a concave bed including a concave proper and a stripping screen section located adjacent to and coacting with said cylinder, said concave being formed with openings of a size such as will permit passage of dust, dirt and like extraneous matter therethrough but will bar the passage of nuts and said screen section being formed with stripping openings of a size to permit the passage of nuts therethrough, said stripping openings being substantially pear-shaped with the enlarged portion of each opening opening extending toward the front of the bed.

2. In a peanut picking machine, a picking cylinder, a concave bed comprising a concave section and a stripping screen section located adjacent to and coacting with said cylinder, said concave section being formed with a series of openings of a size such as will permit the passage of dust, dirt and like extraneous matter therethrough but will bar the passage of nuts and said screen section being formed with stripping openings therein of a size such as will permit the passage of nuts therethrough, and means for adjusting said concave section toward and from the picking cylinder.

3. In a peanut picking machine, a picking cylinder, a concave bed located adjacent to and coacting with said cylinder, said bed being made up of front and rear sections, the front section being provided with a plurality of upwardly-projecting teeth and also having a series of openings therein of a size such as will permit the withdrawal of dust, dirt and like extraneous matter therethrough but will bar the passage of nuts and said rear section having substantially pear-shaped stripping openings of a size permitting the passage of nuts therethrough, means movably mounting said front section, and means for adjusting said front section toward and from said picking cylinder.

4. In a peanut picking machine, a picking cylinder having teeth thereon, a concave bed located adjacent to and coacting with said cylinder, said concave bed having a front section provided with teeth and also formed with a series of slots of a size such as will permit the passage of dust, dirt and like extraneous matter therethrough but will bar the passage of nuts and a rear section having stripping openings therein permitting the passage of nuts therethrough, a plurality of retarding teeth projecting through the forward portion of said bed and coacting with the teeth of the picking cylinder, means for adjusting the position of said front section with respect to the cylinder and means for adjusting the angular position of said retarding teeth independently of said front section.

5. In a peanut picking machine, a rotatable picking cylinder having teeth thereon, an arcuate concave bed located adjacent to and coacting with said cylinder, said concave bed having a front or forward section provided with a series of retarding teeth arranged in substantial alignment in the direction of movement or "sweep" of the teeth of the picking cylinder and another series of teeth shorter than said first-named series also arranged in substantial alignment with respect to the direction of movement of the teeth of the picking cylinder, said cylinder and concave being so positioned with respect to one another that the teeth of the picking cylinder move over the shorter series of teeth.

6. In a peanut picking machine, a picking cylinder, means for feeding vines to said cylinder, a concave bed located beneath and adjacent to said cylinder and including a front screening section having a series of screening openings therein, suction means arranged to create a draft of air downwardly through said screening section to remove dust and dirt by suction assisted by gravity from the vines acted on by said cylinder and concave, and means for conducting the dust and dirt so removed to a point remote from the machine.

7. In a peanut picking machine, a picking cylinder, means for feeding vines to said cylinder, a concave bed located beneath and adjacent to said picking cylinder and including a front section having a series of screening openings therein of a size to permit the withdrawal of dust, dirt and like extraneous matter therethrough but will bar the passage of nuts, and a rear section having stripping openings of a size permitting the passage of nuts therethrough, suction means arranged to create a draft of air downwardly through said screen section to remove dust and dirt by suction assisted by gravity from the vines acted on by said cylinder and concave, and means for conducting the dust and dirt so removed to a point remote from the machine.

8. In a peanut picking machine, a feeding cylinder, a picking cylinder, a stripping screen and concave bed coacting with said picking cylinder, a casing providing a chamber in which said cylinder operates, a feed table of open-work construction, means for creating a suction through said table and also through at least a portion of said bed to thereby withdraw dust and dirt from beneath the vines as they are fed to the picking cylinder over said table and also while being operated on by said cylinder, and means for limiting the amount of vines fed into the machine comprising a star wheel in advance of the picking cylinder.

9. In a peanut picking machine, a feeding cylinder, a picking cylinder, a stripping screen and concave bed coacting with said picking cylinder, a casing providing a chamber in which said cylinder operates, a feed table of open-work construction, means for creating a suction through said table and also through at least a portion of said bed to thereby withdraw dust and dirt from beneath the vines as they are fed to the picking cylinder over said table and also while being operated on by said cylinder, and movable means in advance of the picking cylinder for limiting and rendering uniform the feed into the picking cylinder.

10. In a peanut picking machine, a picking cylinder, a stripping screen and concave bed coacting with said cylinder, a casing providing a chamber in which said cylinder operates, a feed table of open-work construction, means for creating a suction through said table and also through at least a portion of said bed to thereby withdraw dust and dirt from beneath the vines as they are fed to the picking cylinder over said table and also while being operated on by said cylinder, means for supplying vines to the feed table and means for limiting the bulk and for controlling the uniformity of the feed of such vines into the picking cylinder.

11. In a peanut picking machine, means for limiting the amount of vines fed into the machine, a feeding cylinder having teeth, a picking cylinder having teeth intermeshing with the teeth of the feeding cylinder, a stripping screen and concave bed coacting with said picking cylinder, a casing providing a chamber in which said cylinder operates, a feed table of open-work construction, and means for creating a suction through said table and also through at least a portion of said bed to thereby withdraw dust and dirt from beneath the vines as they are fed to the picking cylinder over said table and also while being operated on by said cylinder.

12. In a peanut picking machine, a picking cylinder, a stripping screen and concave bed coacting with said cylinder, a casing providing a chamber in which said cylinder operates, a feed table of open-work construction, means for creating a suction through said table and also through at least a portion of said bed to thereby withdraw dust and dirt from beneath the vines as they are fed to the picking cylinder over said table and also while being operated on by said cylinder, and concave pins or teeth cooperating with said picking cylinder, the said pins or teeth being adjustably mounted with respect to the axis of such cylinder.

13. In a peanut picking machine, a picking cylinder, a stripping screen and concave bed coacting with said cylinder, a casing providing a chamber in which said cylinder operates, a feed table of open-work construction, means for creating a suction through said table and also through at least a portion of said bed to thereby withdraw dust and dirt from beneath the vines as they are fed to the picking cylinder over said table and also while being operated on by said cylinder, and concave pins or teeth cooperating with said picking cylinder, the said pins or teeth being curved and being adjustably and resiliently mounted with respect to the axis of said cylinder.

DANIEL F. GOOD.

REFERENCES CITED

The following references are of record in the file of this patent:

UNITED STATES PATENTS

| Number | Name | Date |
|---|---|---|
| 31,420 | Wagener | Feb. 12, 1861 |
| 452,065 | Rowell | May 12, 1891 |
| 502,619 | Crocker | Aug. 1, 1893 |
| 881,979 | Warren | Mar. 17, 1908 |
| 908,271 | Jones | Dec. 29, 1908 |
| 1,081,593 | Eisenhart et al. | Dec. 16, 1913 |
| 1,230,437 | Schuette | June 19, 1917 |
| 1,428,911 | Sanders | Sept. 12, 1922 |
| 1,617,246 | Freeman | Feb. 8, 1927 |
| 1,744,906 | Livermon | Jan. 28, 1922 |
| 1,776,736 | Livermon | Sept. 23, 1930 |
| 1,935,803 | Lilliston | Nov. 21, 1933 |
| 1,961,534 | Symons | June 5, 1934 |
| 1,983,796 | Geyer | Dec. 11, 1934 |
| 1,986,102 | Cole | Jan. 1, 1935 |
| 2,044,392 | Lord | June 16, 1936 |
| 2,049,024 | Robertson | July 28, 1936 |
| 2,212,296 | Livermon | Aug. 20, 1940 |
| 2,223,455 | McLauchlan | Dec. 3, 1940 |

FOREIGN PATENTS

| Number | Country | Date |
|---|---|---|
| 1,709 | Great Britain | 1867 |